(12) United States Patent
Deshpande

(10) Patent No.: US 8,930,764 B2
(45) Date of Patent: Jan. 6, 2015

(54) SYSTEM AND METHODS FOR SELF-HEALING FROM OPERATING SYSTEM FAULTS IN KERNEL/SUPERVISORY MODE

(75) Inventor: Bhalchandra Dattatray Deshpande, Saratoga, CA (US)

(73) Assignee: Futurewei Technologies, Inc., Plano, TX (US)

( * ) Notice: Subject to any disclaimer, the term of this patent is extended or adjusted under 35 U.S.C. 154(b) by 259 days.

(21) Appl. No.: 13/558,585

(22) Filed: Jul. 26, 2012

(65) Prior Publication Data

US 2014/0032962 A1    Jan. 30, 2014

(51) Int. Cl.
*G06F 11/00* (2006.01)

(52) U.S. Cl.
USPC ........................................... 714/38.1

(58) Field of Classification Search
CPC ... G06F 11/30; G06F 2201/86; G06F 11/079; G06F 11/0793
See application file for complete search history.

(56) References Cited

U.S. PATENT DOCUMENTS

| 7,673,174 B2* | 3/2010 | Swift et al. ...................... 714/15 |
| 8,510,597 B2* | 8/2013 | Swift et al. ...................... 714/15 |
| 2006/0070089 A1* | 3/2006 | Shoaib et al. ................. 719/321 |
| 2012/0204060 A1* | 8/2012 | Swift et al. ...................... 714/15 |

* cited by examiner

*Primary Examiner* — Charles Ehne
(74) *Attorney, Agent, or Firm* — Slater & Matsil, L.L.P.

(57) ABSTRACT

A method, apparatus, and computing system are provided for self-healing from a fault in an operating system (OS) without crashing the OS. In one example, the method includes detecting, isolating, and repairing a faulty kernel code module without affecting the run-time operation of other, properly function, portions of the OS. In another example, the apparatus comprises a variety of modules, including, for instance, a kernel level fault detector and a kernel level fault manager, that are configured to execute steps of the method. In another example, the computing system includes an OS that has at least some modularized kernel code sections, and a self-healing code for detecting, isolating, and repairing failures occurring in one or more of the modularized kernel code sections without crashing the OS.

24 Claims, 4 Drawing Sheets

SYSTEM AND METHODS FOR SELF-HEALING FROM OPERATING SYSTEM FAULTS IN KERNEL/SUPERVISORY MODE

TECHNICAL FIELD

The present invention relates to computing systems and methods, and, in particular embodiments, to techniques for self-healing from a kernel level operating system failure.

BACKGROUND

Operating system (OS) failures are the most common cause of fatal errors in present day computer systems. Unfortunately, there are virtually no reliable techniques for recovering from OS failures other than fully rebooting the system (i.e., crashing the OS), which requires the system to go offline. In some applications (e.g., home computers), going offline to reboot the system may be a mere inconvenience. However, in other applications (e.g., commercial banking, etc.), going offline to reboot the system may result in significant revenue loss. Furthermore, OS crashes can cause critical data to be lost. As such, techniques for recovering from OS failures without fully rebooting the system (i.e., without crashing the OS) are desired.

SUMMARY

In accordance with an embodiment, a method for self-healing from a fault in an operating system (OS) is provided. In this example, the method includes determining that a kernel level fault is attributable to a faulty one of a plurality of kernel code modules, isolating the faulty kernel code module, and repairing the faulty kernel code module without crashing the OS.

In accordance with another embodiment, an apparatus for self-healing from a kernel level fault is provided. In this example, the apparatus comprises a kernel level fault detector configured to detect or predict a kernel level failure that is a attributable to a faulty kernel code module, and a kernel level fault manager configured to isolate the faulty kernel code module from other ones of the plurality of kernel code modules. The kernel level fault manager is further configured to repair the faulty kernel code module without crashing the OS.

In accordance with yet another embodiment, a computing system for self-healing from a kernel level fault is provided. In this example, the computing system includes an operating system (OS) comprising a plurality of kernel code modules, and a self-healing code for detecting, isolating, and repairing a faulty one of the plurality of kernel code modules without crashing the OS.

The foregoing has outlined rather broadly the features of various embodiments to facilitate the readers understanding of the detailed description. Additional features and advantages will be described hereinafter, which form the subject of the claims of the invention. It should be appreciated that the conception and specific embodiments described below may be readily utilized as a basis for modifying or designing other structures or processes for carrying out the same purposes of those embodiments. It should also be realized that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure describe techniques and methods for self-healing from detected or predicted failures in the kernel level of an OS without fully rebooting the system. By allowing computer systems to remain partially or completely operational following a kernel level failure, the self-healing techniques discussed herein may significantly improve overall system reliability. In addition, the self-healing techniques discussed herein may also provide a cost efficient alternative to conventional fault-tolerant computing systems, which achieve increased reliability through including backup hardware components that act as fail-safes in the event of a failure in a primary hardware component. In one example, self-healing is achieved by isolating a faulty kernel module from the remaining, properly functioning, portions of the OS, and deploying a fault manager to selectively repair the faulty kernel module (without disrupting the run-time operation of remaining portions of the OS). These and other novel aspects of this disclosure (which are described in greater detail below) may be useful for a broad array of computing applications, including (but not limited to) storage servers, appliances, cluster servers, embedded platforms, aggregation routers, and others. In particular, embodiments of this disclosure may provide significant advantages in high-end and/or mission-critical servers, where system reliability is at a premium.

Figure 1:
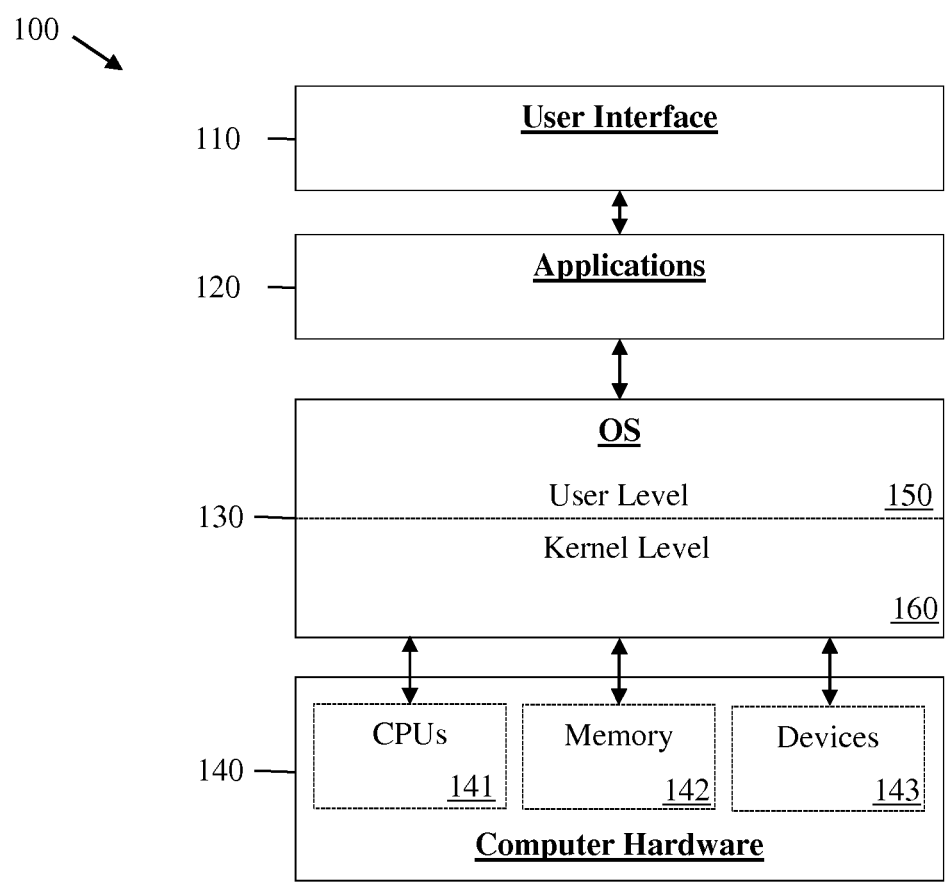
FIG. 1 illustrates a diagram of an embodiment of a computing system.

FIG. 1 illustrates a block diagram of a computing system 100 for implementing aspects of this disclosure. The computing system comprises a user interface 110, a plurality of applications 120, an OS 130, and computer hardware 140. The user interface 110 may include any component or group of components that allows a user to interact with and/or utilize the computing system 100. For instance, the user interface may include on-board hardware (e.g., keyboard, mouse, etc.), ports for external hardware, and/or software (e.g., graphical user interfaces, etc.). The user interface 110 may be omitted in computing systems designed to interact exclusively with other computing systems, e.g., purpose built routers configured to interact with other router, servers, bridges, etc. The applications 120 may include application software that facilitates the performance of specific tasks by the computing system 100. For instance, the applications 120 may include application software that enables a user to create a word-document (e.g., MS word), view a media file (e.g., windows media player), switch data packets based on control information (e.g., IP addresses, MAC addresses, etc.), etc.

The OS 130 may include system software that manages the computer hardware 140. The OS 130 manages the resources of the computer hardware 140 to provide essential services to the applications 120. In such embodiments, the operability of the OS 130 may be vital to the operation of the computer system 100. The OS 130 may be bifurcated into a user level 150 and a kernel level 160, which are discussed in greater detail below. The computer hardware 140 may comprise various component devices that serve as the building blocks of the computer system 100, including a central processing unit (CPU) 141, a memory 142, and other devices 143.

The user level 150 may include relatively less privileged portions of the OS 130 than the kernel level 160. For instance, the kernel level 160 may include portions of the OS that are classified at a supervisory privilege level (or a higher privilege level) when compared to the user level 150. Hence, the kernel level 160 may include the most critical portions of the OS 130, and consequently failures in the kernel level 160 may commonly result in a crash of the OS 130.

The underlying cause of a kernel level failure may typically fall into one of the following classifications: (i) illegal pointer access; (ii) programmed crash point; (iii) memory leak; or (iv) deadlock/resource contention. Illegal pointer access may occur when a bad pointer value is used to access a memory location during OS run-time. The bad pointer may typically be the result of a corrupted linked list (e.g., due to a software bug), a stack overflow, a malfunction in the kernel code (e.g., an incorrect calculation or data handling command executed by the OS), utilization of freed and/or unallocated memory by the OS, or combinations thereof.

Programmed crash points may trigger a controlled OS crash when a check condition is not satisfied during OS run-time. Specifically, a programmer or system designer may introduce check points (e.g., null pointer, inconsistent data value, etc.) into the kernel code to detect and/or predict the occurrence of unrecoverable conditions. When a check condition is not satisfied, the program may execute a planned or designed system crash that is intended to avoid irrevocable damage to the OS and/or computing system.

Memory leaks may occur when a portion of non-pageable memory allocated by a subsystem (e.g., kernel module, devices driver, etc.) is not freed or returned to the OS memory pool. Specifically, non-pageable memory is typically accessed on-demand by OS subsystems, and thereafter freed or returned back to OS memory pool once it is no longer needed. However, software bugs may prevent a subsystem from returning or freeing the memory, thereby resulting in a memory leak. In some instances, the subsystem may be unable to recognize the fact that it has sufficient memory and may continue to demand more and more memory, thereby hogging substantial portions of the OS memory pool. After some time, the OS memory pool may run dry, causing the OS to crash due to insufficient free memory resources.

Deadlocks and/or resource contentions may occur when one or more critical OS resource becomes permanently locked, thereby crippling (and eventually crashing) the OS. Deadlocks may be best understood by way of example. Assume that two inter-dependent processes (process-A and process-B) each hold one mutually exclusive critical resource (e.g., a resource that can only be accessed by one process at a time) that is required by the other. Further assume that both process-A and process-B simultaneously attempt to access the mutually exclusive critical resource held by the other. For instance, process-A is holding resource-X and trying to access resource-Y, while (at the same time) process-B is holding resource-Y and trying to access resource-X. Absent some mechanism (e.g., preemption, etc.) for process-B to wrestle the critical resource away from process-A (or vice-versa), a circular wait situation occurs in which neither process-A nor process-B is executed. If process-A and process-B are trying to acquire the resources in kernel mode, then the resulting deadlock may cause an OS crash.

Conventional techniques for dealing with deadlocks and other software failures at the application level have not translated well to the recovering from software failures at the kernel level. One reason conventional techniques for avoiding software failures are largely ineffective at the kernel level is due to the complex nature of kernel level (e.g., it is difficult to predict when (and in what order) kernel level resources will be accessed). By way of example, one conventional technique for preventing deadlocks at the application level is to constrain resource allocation in a manner that avoids resource contention altogether. For example, in the above discussed scenario, the deadlock could have been avoided by preventing the circular wait condition from occurring in the first place or by terminating one of the processes involved in the deadlock. However, preventing deadlocks in this manner requires advanced knowledge of the relevant processes, which is typically not available at the kernel level (e.g., due to the complex nature of kernel level). Consequently, techniques for preventing deadlocks via constrained resource allocation are often ineffective at the kernel level.

Another reason that conventional techniques for avoiding software failures are largely ineffective at the kernel level is due to the critical nature of kernel level resources. Specifically, recovering from a system software failure (i.e., without rebooting) may leave the system in an inconsistent state. By way of example, one conventional technique for breaking deadlocks is to forcefully remove one or more of the processes that is causing the deadlock, thereby freeing up the critical resource and ending the deadlock. However, forcefully removing a kernel level process may result in an uncontrolled crash of the OS which is particularly undesirable so far as there may generally be no opportunity to store valuable data prior to system shutdown. In other words, forcibly terminating deadlocked processes that are holding or attempting to access kernel level resources may result in the sudden termination of a critical process and/or result in the permanent loss of valuable data (e.g., valuable data that may have otherwise been recoverable had the OS underwent a controlled crash).

Evolution of the modern OS architecture has made these challenges of recovering from catastrophic software failures in O.S kernel somewhat more manageable, at least when using the self-healing techniques described by this disclosure. Historically, the kernel level consisted of a monolithic kernel that included few (if any) partitions and executed most (if not all) OS operations in a common address space. Although these monolithic kernels provided some performance advantages in legacy OS, computing system designers found them to be labor intensive to build and difficult to troubleshoot. As a result, system designers begun building modular sections of kernel code (e.g., kernel code modules), and consequently modern OS have evolved from consisting of a singular monolithic code segment to including at least some modular code segments. Aspects of this disclosure describe exploiting the modular nature of modern OSs by isolating and independently rebooting faulty kernel code modules without affecting the run-time of properly functioning portions of the OS. Notably, isolating and independently rebooting faulty kernel modules effectively mitigates many of the risks/difficulties involved with conventional recovery techniques (e.g., forceful removing kernel level processes), thereby allowing the self-healing techniques discussed below to provide a safe and reliable alternative to rebooting the entire OS (i.e., crashing the OS) in the event of a kernel level fault.

Figure 2:
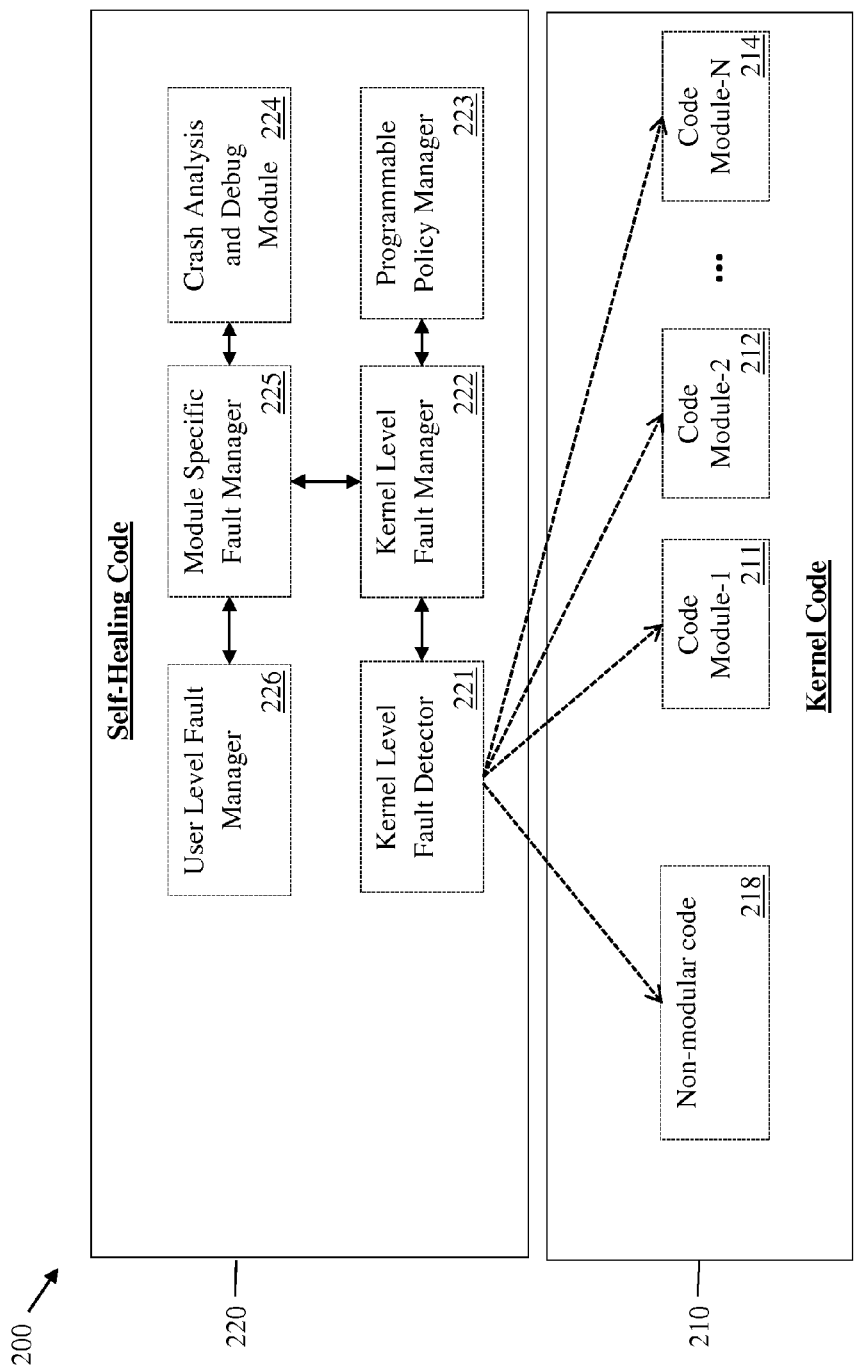
FIG. 2 illustrates a diagram of an embodiment of an OS comprising modularized segments of kernel code and self-healing code.

FIG. 2 illustrates an embodiment of an OS 200 for implementing self-healing techniques pursuant to a kernel level fault. The OS 200 comprises a kernel code 210 and a self-healing code 220. The kernel code 210 may serve a similar purpose to the kernel level 160 depicted in FIG. 1, and (in addition) may include non-modular code 218 as well as one or more kernel code modules 211-214. In an embodiment, the non-modular code 218 may comprise a monolithic section of code, while the kernel code modules 211-214 may comprise modular sections of code.

The self-healing code 220 may be operable for detecting, managing, and recovering from failures in the kernel code 210, and may run at the user level 150 or the kernel level 160. The self-healing code 220 may include several components/modules, including a kernel level fault detector 221, a kernel level fault manager 222, a programmable policy manager 223, a crash analysis and debug module 224, a module specific fault manager 225, and a user level fault manager 226.

The kernel level fault detector 221 may comprise executable instructions that serve to detect various kernel level failures, such as memory leaks and fatal faults (e.g., memory corruptions, bad/illegal pointer values, etc.). Kernel level failures/faults may refer to software failures occurring in the kernel level of the OS, and may be distinct from hardware failures. The kernel level fault manager 222 may comprise executable instructions that serve to take actions to isolate and/or recover from faults detected by the kernel level fault detector 221. In some embodiments, the kernel level fault manager 222 may predict certain non-recoverable faults (e.g., memory leak, etc.) before they occur, and thereafter take preemptive action (e.g., isolate faulty kernel module, prevent fault from occurring, etc.). The programmable policy manager 223 may comprise executable instructions that define a policy (e.g., set of rules) that govern the kernel level fault detector 221 and the kernel level fault manager 222. In some embodiments, the programmable policy manager 223 may provide the kernel level fault manager 222 with fault-specific instructions. For instance, the policy manager 223 may instruct the kernel level fault manager 222 to substitute a back-up or safe module in the event that a certain kernel module suffers repeated failures. As an additional example, the programmable policy manager 223 may instruct the kernel level fault manager 222 to address a memory leak situation once the available OS memory pool falls below a threshold level. Notably, the presence of the programmable policy manager 223 may encourage programmers to design kernel code modules that are easily integrated into the OS 200, e.g., kernel code modules that have readily detectable crash points, etc.

The crash analysis and debug module 224 may comprise executable code that determines or attempts to determine why a kernel level fault occurred. In an embodiment, the crash analysis and debug module 224 may analyze debugging information (e.g., memory state information, stack trace information, etc.) that is saved by the module specific fault manager 225 prior to rebooting the faulty kernel module.

The module specific fault manager 225 may comprise executable code that defines and/or performs module specific tasks for self-healing from a faulty kernel level code module. In embodiments, the tasks may vary significantly depending on the type of the faulty kernel module. For instance, the module specific fault manager 225 may manage the failure of a file system kernel module differently than the failure of, for example, a network protocol kernel module or a device driver kernel module. Hence, the fault manager 225 may perform some module-specific tasks, that are tailored specifically for self-healing from a fault/failure in a specific kernel module type.

In addition to module-specific tasks, the fault manager 225 may also perform some common tasks for all types of faulty kernel code modules. These common tasks may include: (i) making a fault assessment to identify the fault type and determine a fault status (e.g., are any important data structures/states damaged, does important state information need to be saved for later restoration, etc.); (ii) storing self-healing information (e.g., hardware register states, open device states, lists of unwritten data, etc.); (iii) storing debugging information (e.g., memory state, stack trace, and other information); (iv) determining whether the fault affects other kernel modules (e.g., has a deadlock (or other situation) occurred that locks resources accessible by other modules); (v) communicating with the user level fault manager 226 to shut down or suspend relevant user level processes (if needed); (vi) freeing memory allocated by the faulty kernel module to the OS memory pool; (vii) uninstalling and reinstalling the faulty kernel code module; (viii) performing module initialization and state restoration operations (if appropriate); (ix) communicating with the user level fault manager 226 to restart any dependent user level services (if appropriate); and (x) restoring vital module specific data structures and/or state information if any were preserved.

The user level fault manager 226 may comprise executable code for managing portions of the user level OS software services that are affected by the fault. For instance, dependent user level processes that rely on essential services provided by the faulty kernel code module may need to be suspended or restarted. The user level fault manager 226 may also monitor any failure in the user level services and take appropriate action as defined by programmable policy manager 223.

Figure 3:
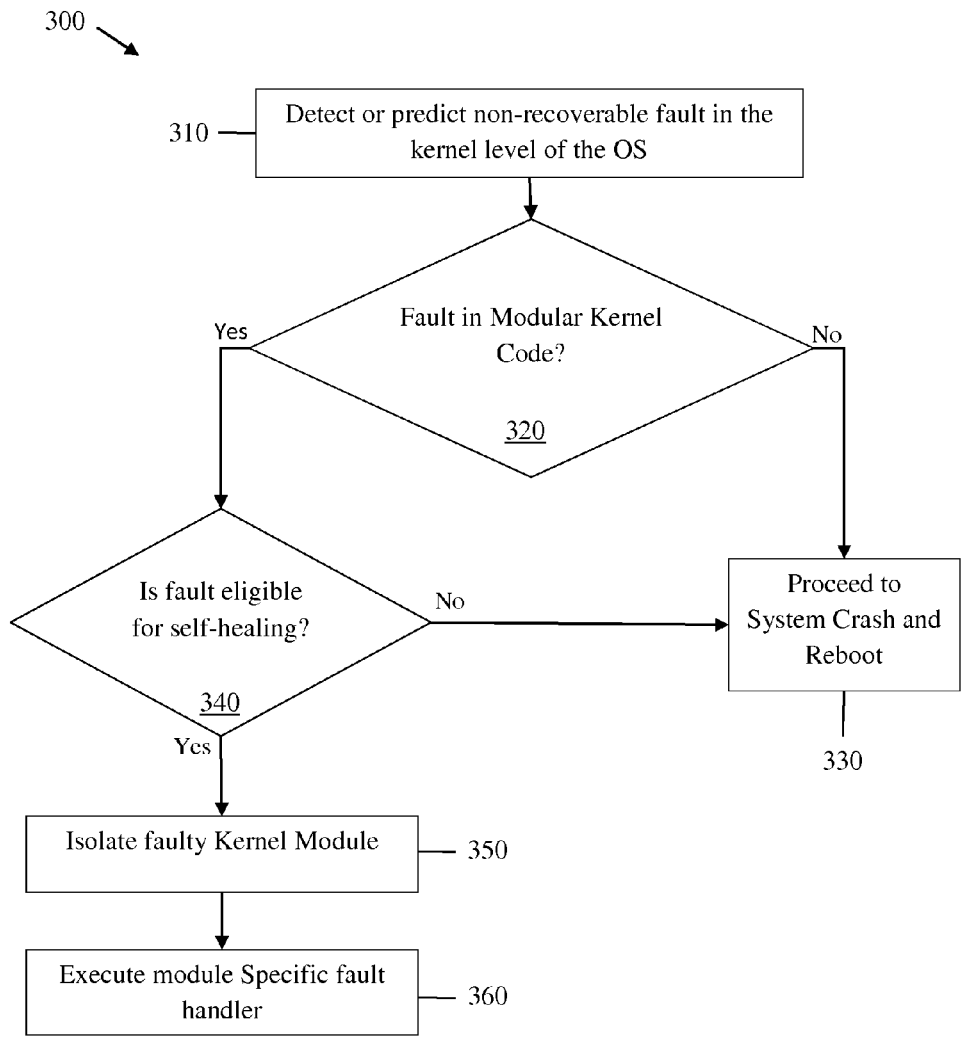
FIG. 3 illustrates a flowchart of an embodiment of a method for self-healing subsequent to a failure in the kernel code.

FIG. 3 illustrates a flowchart of an embodiment of a method 300 for self-healing from a kernel level error, as may be performed by the self-healing code 220 depicted in FIG. 2. The method 300 begins at step 310, where the self-healing code detects or predicts a non-recoverable fault in the kernel level of the OS. Next, the method 300 proceeds to step 320, where the self-healing code determines whether the fault occurred in a modular portion of the kernel code (e.g., one of the code modules 211-214). If the fault did not occur in the modular portion of the kernel code, then the self-healing code may conclude that the fault occurred in a non-modular portion of the kernel (e.g., non-modular code 218), and may proceed to crash the OS at step 330. If the fault did occur in the modular portion of the kernel code, then the method 300 may proceed to step 340, where the self-healing code may determine if the fault is eligible for self-healing. In some embodiments, there may be some faults occurring in a kernel module that are considered too risky for self-healing (e.g., kernel modules that are substantially interdependent with the non-modularized portion of the kernel code, etc.). If the fault is not eligible for self-healing, then the method 300 may proceed to step 330, where the OS may be crashed and rebooted. If the fault is eligible for self-healing, then the method 300 may proceed to step 350, where the faulty kernel module may be isolated from the rest of the system. Isolating the faulty kernel code module may include sending error messages to processes that attempt to execute code in the faulty kernel module. In some embodiments, isolating the faulty kernel code module may also result in temporary suspension of a request (e.g., a system call) for executing the faulty kernel code while the faulty kernel code module that is being repaired. The request may be re-addressed (e.g., processed) after the faulty kernel code module is repaired. In some embodiments, the request module/process may be notified by an error message. In the same or other embodiments, the process or module that is attempting to execute code in the faulty kernel module may be suspended. Thereafter, the method 300 may execute the module specific fault handler to, inter alia, reinitialize and/or replace the faulty kernel code module without affecting the run-time of non-faulty segments of the OS.

Figure 4:
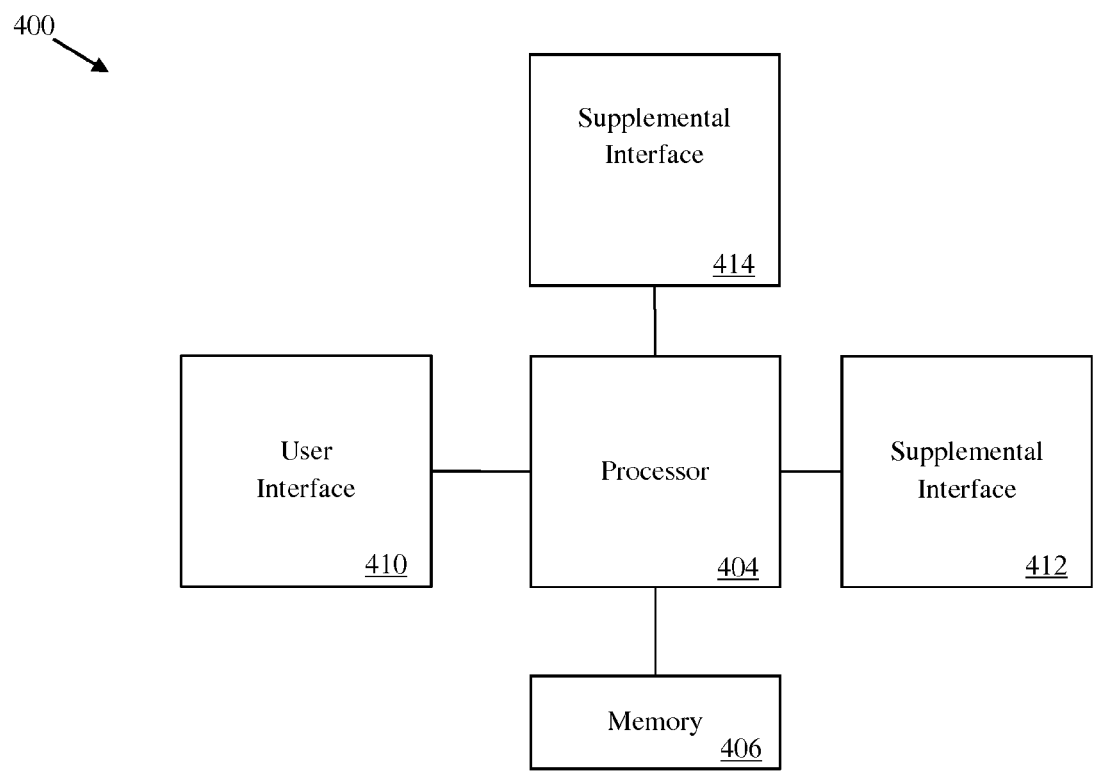
FIG. 4 illustrates a diagram of a hardware module for executing self-healing operations.

FIG. 4 illustrates a diagram of a computer hardware 400 for executing portions of the self-healing code as well as other code (e.g., system software, user software, application software, etc.). The computer hardware 400 may comprise a processor 404, a memory 406, a user interface 410, and a plurality of supplemental interfaces 412-414. The processor 404 may be any component capable of performing computations and/or other processing related tasks, and the memory 406 may be any component capable of storing programming and/or instructions for the processor. The user interface 410 may correspond to the user interface 110 in FIG. 1, and may comprise hardware components and/or software modules that allow a user to interact with and/or utilize a computing system associated the hardware computer hardware 400. The supplemental interfaces 412-414 may comprise hardware components and/or software modules that allow a computing system associated the hardware computer hardware 400 to interact with other systems (e.g., routers, servers, etc.).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for self-healing from a fault in an operating system (OS), the method comprising:
    detecting or predicting a fault in a kernel code of the OS, the kernel code comprising a plurality of kernel code modules;
    determining that the fault is attributable to a faulty one of the plurality of kernel code modules;
    isolating the faulty kernel code module from other ones of the plurality of kernel code modules; and
    repairing the faulty kernel code module without crashing the OS, wherein repairing the faulty kernel code module without crashing the OS comprises uninstalling and reinstalling the faulty kernel module without affecting run-time operations of other ones of the plurality of kernel code modules.

2. The method of claim 1, wherein isolating the faulty kernel code comprises returning an error code to system processes that are executing the faulty kernel code module when the fault occurs.

3. The method of claim 2, wherein isolating the faulty kernel code further comprises:
    suspending any new request for services of the faulty kernel code module that are made after detection of the fault, the new request being suspended until after the faulty kernel code module has been recovered or repaired.

4. The method of claim 1 further comprising:
    identifying one or more OS processes that operate at the user level and rely on services provided by the faulty kernel code module; and
    shutting down or suspending the one or more identified OS processes.

5. The method of claim 4 further comprising:
    pursuant to repairing the faulty kernel code module, restoring and re-initializing the faulty kernel code module; and
    pursuant to restoring and re-initializing the faulty kernel code module, restoring the one or more identified OS processes.

6. The method of claim 1, wherein the fault is detected or predicted by a kernel level fault detector, wherein the fault is isolated and repaired by a kernel level fault manager, and wherein the method further comprises:
    managing, by a policy manager, the kernel level fault detector and the kernel level fault manager.

7. The method of claim 6, wherein the policy manager comprises executable code indicating a module specific memory usage limit or pattern for the faulty kernel code module, and wherein the kernel level fault detector comprises executable code for detecting a memory leak in the faulty kernel code module in accordance with the module specific memory usage limit or pattern.

8. The method of claim 1, wherein repairing the faulty kernel code module without crashing the OS comprises:
    performing a set of tasks to repair the faulty kernel code module, the set of tasks being dependent on a type associated with the faulty kernel code module, wherein performing the set of tasks to repair the faulty kernal code module comprises making a fault assessment to identify a fault type and determine if any important data structures or data states have been damaged.

9. The method of claim 8, wherein performing the set of tasks to repair the faulty kernel code module further comprises:
    identifying state information stored in a memory allocated by the faulty kernel code module;
    storing the state information in a secure memory location prior to reinitializing the faulty kernel code module; and
    restoring module specific data structures using the stored state information subsequent to rebooting the faulty kernel code module.

10. The method of claim 8, further comprising:
    identifying one or more user level processes that rely on services provided by the faulty kernel code module; and
    suspending the one or more identified user level processes pursuant to said identification by the module specific fault manager.

11. An apparatus comprising:
    a computer readable storage medium storing programming for execution by a processor, the programming including:
        a kernel level fault detector comprising executable code for detecting or
        predicting a kernel level failure in an operating system (OS), the kernel level failure attributable to a faulty one of a plurality of kernel code modules; and
        a kernel level fault manager comprising executable code for isolating the faulty kernel code module from other ones of the plurality of kernel code modules, and for repairing the faulty kernel code module without crashing the OS, wherein the kernel level fault manager repairs the faulty kernel code module without crashing the OS by uninstalling and reinstalling the faulty kernel module without affecting run-time operations of other ones of the plurality of kernel code modules.

12. The apparatus of claim 11, wherein the executable code for isolating the faulty kernel code module includes executable code for returning an error code to system processes that are executing the faulty kernel code module when kernel level failure occurs.

13. The apparatus of claim 11, wherein the executable code for isolating the faulty kernel code module includes executable code for temporarily suspending one or more system calls for executing the faulty kernel code module while the faulty kernel code module is being repaired, and
wherein the one or more system calls are made by other kernel code modules or by system processes.

14. The apparatus of claim 11, wherein the executable code for repairing the faulty kernel code module without crashing the OS includes executable code for reinitializing the faulty kernel code module without interfering with run-time operation of other ones of the plurality of kernel code modules, the reinitializing including restoring an initial state of the faulty kernel code module as was established when the OS was first booted.

15. The apparatus of claim 11, wherein the executable code for repairing the faulty kernel code module without crashing the OS includes executable code for reloading the faulty kernel code module without interfering with run-time operation of other ones of the plurality of kernel code modules, the reloading including removing the faulty kernel code module from the OS, and thereafter loading a new kernel code module to the OS, the new kernel code module comprising executable code for providing similar services as the faulty kernel code module.

16. The apparatus of claim 15, wherein the executable code for repairing the faulty kernel code module without crashing the OS further includes executable code for locating and repairing a corrupted portion of the faulty kernel code module, thereby generating the new kernel code module, the corrupted portion of the faulty kernel code module being at least partially responsible for the kernel level failure.

17. The apparatus of claim 11, wherein the programming further includes:
a crash analysis and debug module comprising executable code for identifying an underlying cause of the kernel level failure, the underlying cause corresponding to at least one of an illegal pointer access, a programmed crash point, a memory leak, and a deadlock.

18. The apparatus of claim 11, wherein the programming further includes:
a module specific fault manager comprising executable code for performing a set of tasks to repair the faulty kernel code module, the set of tasks being dependent on a type associated with the faulty kernel code module.

19. The apparatus of claim 18, wherein the executable code for performing a set of tasks includes executable code for:
identifying state information stored in a memory allocated by the faulty kernel code module;
storing the state information in a secure memory location prior to reinitializing the faulty kernel code module; and
restoring module specific data structures using the stored state information subsequent to rebooting the faulty kernel code module.

20. The apparatus of claim 11, wherein the programming further includes:
a module specific fault manager comprising executable code to identify and store debugging state information related to the faulty kernel code module; and
a crash analysis and debug module comprising executable code for debugging the faulty kernel code module based on the debugging state information.

21. An apparatus comprising:
a computer readable storage medium storing programming for execution by a processor, the programming including:
a kernel level fault detector comprising executable code for detecting or predicting a kernel level failure in an operating system (OS), the kernel level failure attributable to a faulty one of a plurality of kernel code modules;
a kernel level fault manager comprising executable code for isolating the faulty kernel code module from other ones of the plurality of kernel code modules, and for repairing the faulty kernel code module without crashing the OS; and
a policy manager comprising executable code for managing the kernel level fault detector and the kernel level fault manager.

22. The apparatus of claim 21, wherein the policy manager comprises executable code indicating a module specific memory usage limit or pattern for the faulty kernel code module, and wherein the kernel level fault detector comprises executable code for detecting a memory leak in the faulty kernel code module in accordance with the module specific memory usage limit or pattern.

23. An apparatus comprising:
a computer readable storage medium storing programming for execution by a processor, the programming including:
a kernel level fault detector comprising executable code for detecting or predicting a kernel level failure in an operating system (OS), the kernel level failure attributable to a faulty one of a plurality of kernel code modules;
a kernel level fault manager comprising executable code for isolating the faulty kernel code module from other ones of the plurality of kernel code modules, and for repairing the faulty kernel code module without crashing the OS; and
a module specific fault manager comprising executable code for performing a set of tasks to repair the faulty kernel code module, the set of tasks being dependent on a type associated with the faulty kernel code module, wherein the executable code for performing the set of tasks includes executable code for making a fault assessment to identify a fault type and determine if any important data structures or data states have been damaged.

24. An apparatus comprising:
a computer readable storage medium storing programming for execution by a processor, the programming including:
a kernel level fault detector comprising executable code for detecting or predicting a kernel level failure in an operating system (OS), the kernel level failure attributable to a faulty one of a plurality of kernel code modules;
a kernel level fault manager comprising executable code for isolating the faulty kernel code module from other ones of the plurality of kernel code modules, and for repairing the faulty kernel code module without crashing the OS;
a module specific fault manager comprising executable code for identifying one or more user level processes that rely on services provided by the faulty kernel code module; and a user level fault manager comprising executable code for suspending the one or more identified user level processes pursuant to said identification by the module specific fault manager.

\* \* \* \* \*